(12) United States Patent
Sanders

(10) Patent No.: US 7,736,412 B1
(45) Date of Patent: Jun. 15, 2010

(54) GYPSUM FERTILIZER PRODUCTS WITH POLYMER ADJUVANTS

(75) Inventor: John Larry Sanders, Leawood, KS (US)

(73) Assignee: Specialty Fertilizer Products, LLC, Leawood, KS (US), part interest ( * ) Notice: Subject to any disclaimer, the term of this patent is extended or adjusted under 35 U.S.C. 154(b) by 0 days.

(21) Appl. No.: 12/710,240

(22) Filed: Feb. 22, 2010

Related U.S. Application Data

(63) Continuation of application No. 12/573,506, filed on Oct. 5, 2009, now Pat. No. 7,686,863.

(51) Int. Cl.
*C05D 9/02* (2006.01)

(52) U.S. Cl. .............................. 71/53; 71/63; 71/64.07; 71/903

(58) Field of Classification Search ...................... 71/53, 71/63, 64.07, 903
See application file for complete search history.

(56) References Cited

U.S. PATENT DOCUMENTS

| | | | |
|---|---|---|---|
| 2,616,849 A | 11/1952 | Giammaria | |
| 4,083,835 A | 4/1978 | Pohlemann et al. | |
| 4,471,100 A | 9/1984 | Tsubakimoto et al. | |
| 4,929,690 A | 5/1990 | Goertz et al. | |
| 5,047,078 A | 9/1991 | Gill | |
| 5,688,907 A | 11/1997 | Wood et al. | |
| 5,997,602 A | 12/1999 | Aijala | |
| 6,139,596 A | 10/2000 | Barth et al. | |
| 6,187,074 B1 | 2/2001 | von Locquenhien et al. | |
| 6,287,359 B1 | 9/2001 | Erhardt et al. | |
| 6,309,439 B1 | 10/2001 | von Locquenghien et al. | |
| 6,312,493 B1 | 11/2001 | Eltink et al. | |
| 6,413,292 B1 | 7/2002 | v. Locquengh et al. | |
| 6,488,734 B1 | 12/2002 | Barth et al. | |
| 6,515,090 B1 | 2/2003 | Sanders et al. | |
| 6,653,428 B1 | 11/2003 | Klein et al. | |
| 6,706,837 B2 | 3/2004 | Sanders et al. | |
| 6,930,139 B2 | 8/2005 | Sanders et al. | |
| 7,317,062 B2 | 1/2008 | Pritschins et al. | |
| 7,686,863 B1 * | 3/2010 | Sanders .......................... | 71/53 |
| 2001/0029762 A1 | 10/2001 | Steele et al. | |
| 2005/0115290 A1* | 6/2005 | Sanders et al. .................. | 71/28 |
| 2007/0027281 A1 | 2/2007 | Michl et al. | |
| 2008/0173053 A1 | 7/2008 | Sanders et al. | |
| 2009/0163365 A1 | 6/2009 | Bentlage et al. | |
| 2009/0270257 A1 | 10/2009 | Pursell et al. | |

FOREIGN PATENT DOCUMENTS

| | | |
|---|---|---|
| DE | 4132620 | 4/1993 |
| JP | 54050027 | 4/1979 |
| JP | 54077294 | 6/1979 |
| JP | 61282301 | 12/1986 |

OTHER PUBLICATIONS

Newly Developed Itaconic Acid Copolymers for Gypsum and Calcium Carbonate Scale Control; Shakkthivel et al.; Journal of Applied Polymer Science; 2007; vol. 103, Issue 5, pp. 3206-3213.

Water Soluble Polymers. Ix. N-(2-chloroethyl)-sulfonamides of Styrene-maleic Acid and Styrene-itaconic Acid Copolymers; Machida et al.; Sen'i Gakkaishi (1966), 22(6), 269-73.

In-situ Polymerization of Maleic Acid and Itaconic Acid on Cotton: MALDI/TOF Mass Spectroscopy and Light-Scattering Study; Charles Q. Yang.; Yun Lu; Textile Research Journal, vol. 70, No. 4, 359-62 (2000).

* cited by examiner

*Primary Examiner*—Wayne Langel
(74) *Attorney, Agent, or Firm*—Hovey Williams LLP

(57) ABSTRACT

Improved gypsum fertilizer compositions are provided by coating of naturally-occurring or synthesized gypsum with low pH maleic-itaconic copolymers. The preferred copolymers are aqueous dispersions of acid or partial salt maleic-itaconic copolymers, and are applied by spraying or other means onto the surface of gypsum and allowed to dry. The copolymer coatings increase the solubility of sulfate and Ca ions from the gypsum, allowing accelerated plant availability and uptake of such nutrients.

14 Claims, No Drawings

GYPSUM FERTILIZER PRODUCTS WITH POLYMER ADJUVANTS

CROSS-REFERENCE TO RELATED APPLICATION

This application is a continuation of identically-titled application Ser. No. 12/573,506, filed Oct. 5, 2009, which is incorporated in its entirety by reference herein.

BACKGROUND OF THE INVENTION

1. Field of the Invention

The present invention is broadly concerned with fertilizer compositions and methods wherein the compositions include gypsum together with an amount of a copolymer adjuvant or additive serving to significantly increase the availability of sulfate and Ca in soil, particularly during the early stages after application of the fertilizer compositions. More particularly, the invention is concerned with such fertilizer compositions and methods wherein the dried residue of an aqueous, very low pH copolymer dispersion (e.g., either a true solution or a mixture) coats the gypsum, especially commercial grade agricultural gypsum, and wherein the copolymer includes respective quantities of maleic and itaconic moieties.

2. Description of the Prior Art

Gypsum is a soft mineral compound formed of calcium sulfate (CaSO4), usually found in nature in the dihydrate form (CaSO4.2H2O). It is colorless to white with a silky, pearly, or waxy luster, and commonly has various colored impurities. Gypsum occurs in nature as flattened and often twinned crystals and transparent cleavable masses called selenite. It may also be granular or quite compact. Gypsum has a number of commercial uses, and is well known as a fertilizer and soil conditioner. In the late 18th and early 19th centuries, Nova Scotia gypsum, often referred to as plaister, was a highly sought fertilizer for wheat fields. Gypsum is also used in ameliorating sodic soils. A significant advantage of gypsum is that it is relatively low in cost, while containing substantial quantities of nutrients; e.g., commercial gypsum grades normally contain about 22% Ca and 17% S.

When applied to soils, gypsum supplies crop-available forms of calcium and sulfate ions. However, owing to the very limited solubility of gypsum in water, positive fertilizing results or soil amendments may require a two or three year program of applications. Hence, although gypsum fertilizer use is well-recognized, the slow action of gypsum does not provide immediate help, either in the form of plant nutrition or soil remediation.

There is accordingly a need in the art for enhanced forms of fertilizer gypsums which accelerate the availability of calcium and sulfate ions in the soil, while at the same time not detracting from the desirable properties of the gypsums.

SUMMARY OF THE INVENTION

The present invention overcomes the problems outlined above and provides improved gypsum fertilizer compositions comprising respective quantities of gypsum (either in the refined anhydrous or hydrated form) together with a copolymer in contact with the gypsum and containing individual quantities of maleic and itaconic moieties. The gypsum may be any commercial grade suitable for fertilizer use, and may be naturally occurring or synethized as a byproduct. Advantageously, the gypsum is in the form of granules or pellets having a maximum dimension of up to about one inch, and more preferably up to about one quarter inch. As used herein, "commercial grade agricultural gypsum" refers to a gypsum product containing at least about 80% by weight calcium sulfate (more preferably from about 84-97% by weight), from about 19-27% by weight elemental calcium equivalent (more preferably from about 21-25% by weight), and from about 15-23% by weight elemental sulfur equivalent (more preferably from about 16-21% by weight). Such gypsum would also include impurities such as calcium carbonate and other trace materials.

The preferred copolymer adjuvants of the invention are applied to or used with gypsum as aqueous, low pH copolymers containing maleic and itaconic moieties, usually derived from the corresponding acids or anhydrides. While other monomers may form a part of the maleic-itaconic copolymers, the itaconic and maleic monomers should together form the preponderant fraction of the copolymers. Advantageously, other monomers should be present only in minor amounts of up to about 7% by weight, more preferably up to about 4% by weight, based upon the total weight of the copolymer taken as 100% by weight. Stated otherwise, the copolymers should comprise at least about 93% by weight, more preferably about 96% by weight, of a combination of itaconic and maleic monomers. Most preferably, the copolymer consists essentially of or is entirely made up of maleic and itaconic moieties. Ideally, the polymer fraction consists essentially of the itaconic/maleic copolymers, i.e., it is essentially free of other types of monomers. The copolymer is preferably an aqueous solution or dispersion and is highly acidic. The pH usually ranges from about 0.1-2, and more preferably from about 0.2-0.8. Where partial salt forms of the copolymer are employed, the pH levels would be on the higher end of the foregoing ranges. A variety of salt-forming cations may be used, but sodium and potassium are preferred.

Generally, the fertilizer compositions include predominant amounts of gypsum of from about 95-99.95% by weight, more preferably from about 97-99.93% by weight, and most preferably from about 98-99.9% by weight, with the total weight of the composition taken as 100% by weight. For reasons of cost and availability, commercial grade agricultural gypsum is preferred. Correspondingly, the copolymer fraction is the dried residue of the initially aqueous copolymers described above, and such residue should be present at a level such that the plant availability of calcium and/or sulfate ion is greater than the corresponding plant availability of untreated gypsum; more preferably, the plant availability of the calcium and/or sulfate ions in the case of the compositions of the invention is at least about 15%, and most preferably at least about 30%, greater than that of uncoated gypsum. In terms of weight amounts, the dried residue of the copolymers is generally from about 0.05-5% by weight, more preferably from about 0.07-3% by weight, and most preferably from about 0.1-2% by weight, with the total weight of the composition taken as 100% by weight.

The compositions may be simply prepared by spraying or otherwise applying the low pH aqueous copolymer to the gypsum, followed by drying to yield the dried residue of the copolymer on the surface of the gypsum. Such coated gypsum products are then used in the usual fashion by application to soils, with or without incorporation of the gypsum into the soil. Although less desirable, it would also be possible to initially apply gypsum followed by an application of copolymer as a field dressing.

A particular advantage of the fertilizer compositions of the invention is the enhanced availability of calcium and sulfate ions when applied to soil. Further, the fertilizer compositions generate continuing quantities of these nutrients. This results from the fact that the highly acidic copolymer reacts in the soil with calcium sulfate to yield sulfuric acid plus a partial calcium salt of the copolymer formed in situ. The so-formed partial copolymer salt then reacts in the soil to generate further quantities of the acid form of the copolymer and calcium sulfate. Thus, a cyclic reaction is generated in the soil, which provides sustaining quantities of plant nutrients. Such a beneficial result arises from the use of the low pH copolymers, as compared with copolymers of higher pH.

DETAILED DESCRIPTION OF THE PREFERRED EMBODIMENTS

Maleic-itaconic copolymers are described in U.S. Pat. Nos. 6,515,090 and 6,706,837, both fully and completely incorporated by reference herein, with special reference to the operative examples of the '837 patent. In general, the copolymers should desirably contain from about 10-90% by weight maleic moieties (more preferably from about 25-75% by weight), and correspondingly from about 90-10% by weight itaconic moieties (more preferably from about 75-25% by weight). One particularly preferred copolymer of this class is a 40% by weight solids aqueous copolymer dispersion of substantially equimolar amounts of itaconic and maleic anhydride moieties and having a pH of about 0.5.

The most preferred polymers of the invention are reaction products of the following maleic acid and itaconic monomers:

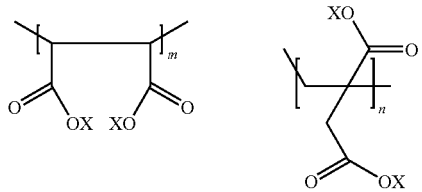

where X is individually and respectively taken from the group consisting of cations, preferably hydrogen, Na, K, and mixtures thereof, and the m:n ratio ranges from about 99:1 to about 1:99. In order to obtain the desirable low pH values for aqueous dispersions of the copolymer, the copolymer may be used in acid form (i.e., all or essentially all X moieties are H), or partial salts wherein the proponderant amount of X moieties are H and some of the X moieties are Na, K, or mixtures thereof.

This reaction product of the above-described reactants has the general formula:

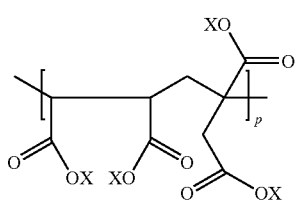

where X is as defined above and p from about 10 to 500.

The following examples set forth preferred fertilizer compositions of the invention. It is to be understood, however, that these examples are provided by way of illustration and nothing therein should be taken as a limitation upon the overall scope of the invention.

Example 1

In this example, the preferred copolymer of the invention was used to coat gypsum, and the resultant improved solubility of the coated gypsum was evaluated. The coating material was an acid form aqueous copolymer (pH 0.5) having approximately 40% by weight solids and made up of substantially equimolar amounts of maleic and itaconic moieties. The copolymer was applied at two levels, namely 1 gallon per ton of gypsum and 1$^1$/2 gallons per ton of gypsum.

Commercial grade agricultural gypsum pellets or granules were coated with the aqueous copolymer dispersion using a standard rotating cement mixer. The gypsum was first placed within the mixer, and thereafter the copolymer was applied in sufficient quantities to substantially completely coat all of the gypsum pellets. The rotation of the mixer was continued until the pellets were dry to touch. The dried coated pellets included about 0.2% or 0.3% by weight dried copolymer residue thereon, based upon the total weight of the fertilizer compositions taken as 100% by weight.

Next, average weight of uniformly sized coated gypsum pellets was determined. Triplicate samples were then prepared, each sample containing ten of the weighed pellets for the control (no copolymer), and coated pellets (0.2 and 0.3% by weight dried copolymer residue). Each sample was placed in a flask containing 5 ml of deionized water, and the respective sample sets were shaken for periods of five, ten, and twenty minutes using a standard laboratory rotary shaker. Next, each shaken sample was filtered to remove the pellets, and the liquid filtrate sample was analyzed in a Varian ICP-MS (inductively coupled plasma-mass spectrometer) to determine the concentrations of sulfate sulfur and Ca therein. The pH of each liquid sample was also determined.

The following Table 1 sets forth the results of this study.

TABLE 1

| Dried Polymer Concentration | 5 Minute Extraction (Avg.) | | | 10 Minute Extraction (Avg.) | | | 20 Minute Extraction (Avg.) | | |
| --- | --- | --- | --- | --- | --- | --- | --- | --- | --- |
| | % S | % Ca | pH | % S | % Ca | pH | % S | % Ca | pH |
| None | 2.15 | 3.63 | 6.4 | 1.49 | 2.33 | 6.4 | 2.01 | 3.13 | 6.3 |
| 0.2% | 2.03 | 3.14 | 5.9 | 1.89 | 2.99 | 6.0 | 2.58 | 3.99 | 6.1 |
| 0.3% | 1.78 | 2.86 | 5.7 | 1.94 | 2.91 | 6.0 | 2.18 | 3.46 | 6.0 |
| p > f | 0.47 | 0.28 | <0.01 | 0.19 | 0.23 | 0.08 | 0.16 | 0.34 | 0.10 |
| LSD$_{(0.10)}$ | NS | NS | 0.2 | 0.47 | NS | 0.3 | 0.51 | NS | 0.2 |

Example 2

In this study, the same copolymer coated gypsum pellets described in Example 1 were used. However, in this example, three sets of quadruplicate samples of the 0.2% by weight and 0.3% by weight compositions, and three sets of quadruplicate uncoated control samples, were prepared. Each such sample contained approximately 1 gram of the coated or uncoated pellets. These samples were each placed within 10 ml of deionized water and shaken using the laboratory shaker for periods of 5, 10, and 20 minutes. Thereafter the samples were filtered and the concentrations of Ca and sulfate sulfur in the filtered liquid were determined using the ICP-MS. pH values were also determined. The following Table 2 sets forth the results of this study.

TABLE 2

| Sample/Shaker Time | % by wt Ca | % by wt Sulfate Sulfur | pH |
|---|---|---|---|
| Control/5 minutes | 0.96 | 0.82 | 6.46 |
| Control/5 minutes | 0.96 | 0.82 | 6.62 |
| Control/5 minutes | 0.8 | 0.70 | 6.74 |
| Control/5 minutes | 0.94 | 0.82 | 6.65 |
| 0.2%/5 minutes | 1.04 | 0.90 | 5.83 |
| 0.2%/5 minutes | 0.94 | 0.80 | 5.75 |
| 0.2%/5 minutes | 0.85 | 0.73 | 6.10 |
| 0.2%/5 minutes | 1.21 | 1.02 | 5.83 |
| 0.3%/5 minutes | 0.98 | 0.84 | 5.79 |
| 0.3%/5 minutes | 0.99 | 0.87 | 5.76 |
| 0.3%/5 minutes | 1.06 | 0.92 | 5.67 |
| 0.3%/5 minutes | 1.05 | 0.92 | 5.66 |
| Control/10 minutes | 0.90 | 0.81 | 6.65 |
| Control/10 minutes | 0.86 | 0.77 | 6.72 |
| Control/10 minutes | 0.85 | 0.77 | 6.77 |
| Control/10 minutes | 1.00 | 0.81 | 6.71 |
| 0.2%/10 minutes | 1.17 | 1.01 | 6.03 |
| 0.2%/10 minutes | 0.90 | 0.80 | 6.16 |
| 0.2%/10 minutes | 1.14 | 1.01 | 5.94 |
| 0.2%/10 minutes | 0.93 | 0.84 | 5.94 |
| 0.3%/10 minutes | 1.01 | 0.88 | 5.93 |
| 0.3%/10 minutes | 1.12 | 1.00 | 5.76 |
| 0.3%/10 minutes | 1.28 | 1.12 | 5.65 |
| 0.3%/10 minutes | 1.25 | 1.11 | 5.71 |
| Control/20 minutes | 0.93 | 0.86 | 6.75 |
| Control/20 minutes | 0.95 | 0.87 | 6.80 |
| Control/20 minutes | 0.83 | 0.79 | 6.85 |
| Control/20 minutes | 0.85 | 0.80 | 6.88 |
| 0.2%/20 minutes | 0.95 | 0.89 | 6.34 |
| 0.2%/20 minutes | 1.11 | 1.01 | 6.23 |
| 0.2%/20 minutes | 1.17 | 1.05 | 6.11 |
| 0.2%/20 minutes | 1.36 | 1.23 | 6.17 |
| 0.3%/20 minutes | 0.92 | 0.85 | 6.03 |
| 0.3%/20 minutes | 1.11 | 0.98 | 6.09 |
| 0.3%/20 minutes | 1.05 | 0.95 | 6.15 |
| 0.3%/20 minutes | 0.93 | 0.85 | 5.97 |

The average sulfate sulfur and Ca values and statistical analyses were:

| | |
|---|---|
| Control/5 minutes | 0.79 |
| 0.2%/5 minutes | 0.86 |
| 0.3%/5 minutes | 0.89 |
| % S p > f | 0.24 |
| % S LSD$_{(0.10)}$ | 0.10 |
| % Ca p > f | 0.29 |
| % Ca LSD$_{(0.10)}$ | 0.13 |
| Control/10 minutes | 0.81 |
| 0.2%/10 minutes | 0.92 |
| 0.3%/10 minutes | 1.03 |
| % S p > f | 0.07 |
| % S LSD$_{(0.10)}$ | 0.14 |
| % Ca p > f | 0.06 |
| % Ca LSD$_{(0.10)}$ | 0.17 |
| Control/20 minutes | 0.83 |
| 0.2%/20 minutes | 1.04 |
| 0.3%/20 minutes | 0.91 |
| % S p > f | 0.06 |
| % S LSD$_{(0.10)}$ | 0.14 |
| % Ca p > f | 0.07 |
| % Ca LSD$_{(0.10)}$ | 0.17 |

These data are statistically significant, as noted above, and demonstrate that the solubility of commercial grade granular or pelleted gypsum is enhanced by the copolymers of the invention. As such, the compositions hereof provide better and accelerated plant availability of sulfate and calcium. The quick-acting gypsum fertilizer composition made through use of the copolymer coatings provides an attractive S fertilizer and a more available source of soluble Ca for soil amendment (e.g., in peanut production where supplemental Ca is sometimes important), or where high concentrations of Na producing undesirable soil physical conditions may be replaced by the soluble Ca provided with the present fertilizer composition.

Example 3

In this series of tests, the preferred polymer-coated gypsum fertilizer of Example 1 was tested with bermudagrass to ascertain improvements in yield and quality of product.

Materials and Methods

Four repetitions of five plots each measuring 5'×20' were randomly assigned on an established Tifton 44 bermudagrass pasture in Lafayette County, Arkansas. The soil type, Severn silt loam, had a pH of 7.6. The plots were on a deep, well drained, gently undulating soil located on the flood plain along the Red River. Slopes were 0-3%. Soil tests were taken before treatments were applied. Phosphorus (P) and potassium (K) were adequate at 75.4 ppm and 146.8 ppm, respectively.

Initial plot treatments were (1) a negative control (NC), no sulfur added; (2) uncoated gypsum ($CaSO_4$) at a rate of 20 lbs S/acre; (3) 0.2% polymer coating on gypsum applied at a rate of 20 lbs S/acre; (4) 0.3% polymer coating on gypsum applied at a rate of 20 lbs S/acre and (5) ammonium sulfate (($NH_4$)$2SO_4$) applied at a rate of 87 lbs/acre (21 lbs S/A). Ammonium nitrate ($NH_4NO_3$) was also applied to all plots, both initially and on each harvest date at a rate of 96 lbs/acre, except for the ammonium sulfate plots. In the latter, ammonium nitrate was applied at 50 lbs/acre due to the N contribution from the ammonium sulfate.

The plots were harvested at four week intervals using a Craftsman 6.75 horsepower push mower with clipping bag to collect grass samples. Harvest swaths were 3"×22"×20'. After samples were collected, total sample weights were recorded, a grab sample was taken and weighed for fresh weight and dry weight to determine dry matter content (DM) and to compute yield per acre.

The plot samples were analyzed for feed quality. Specifically, the samples were dried at 60° C. and ground with a Wiley Mill through a 2 mm stainless steel screen, then scanned using the FOSS NIR 5000 to determine quality of the bermudagrass. Statistical analysis was performed using a randomized complete block design in SAS (8).

A second set of dry ground samples was analyzed for complete inorganic content. Using the dry weight and nutrient concentrations, nutrient uptake per acre was computed.

Results and Discussion

These field studies indicate that polymer coating of gypsum was most effective in the first cutting following application. Polymer coatings of 0.2 and 0.3% in the first cutting increased yield by approximately 19.5% over the no-polymer gypsum when evaluated as a source of sulfur for hybrid bermudagrass. There was no advantage for the higher polymer concentration.

In the second cutting, the lower polymer coating did not increase bermudagrass yield over the uncoated control but the higher 0.3% coating did provide a 10% yield increase.

Understandably, the coated gypsum did not perform as well as ammonium sulfate as a S source in the first cutting. However, by the second cutting the polymer-coated gypsum was more effective than the highly soluble ammonium sulfate suggesting luxury consumption of S by the crop in the first cutting when ammonium sulfate was the S source. On the other hand, S availability was extended by the slower solubility of the polymer-coated gypsum.

These studies confirm that the polymer coating can and does enhance S availability from granular gypsum, thereby increasing plant yields under S deficient soil conditions. The following Table 3 shows the yield results of this series of tests. The bermudagrass samples were also assayed for sulfur uptake, as set forth in Table 4 below.

TABLE 3

| Treatment | Cutting 1 | | Cutting 2 | | Total |
| --- | --- | --- | --- | --- | --- |
| | lb/A | *% inc | lb/A | *% inc | lb/A |
| No gypsum control | 2465 | — | 1960 | — | 4424 |
| Uncoated gypsum | 2583 | — | 2087 | — | 4671 |
| Gypsum + 0.2% polymer | 3089 | 19.6 | 2082 | −0.2 | 5170 |
| Gypsum + 0.3% polymer | 3088 | 19.5 | 2193 | 10.1 | 5232 |
| Am. sulfate | 3222 | — | 2043 | — | 5340 |
| p > f | 0.005 | | 0.90 | | — |
| $LSD_{.10}$ | 340 | | NS | | 580 |

*% increase over uncoated gypsum

TABLE 4

| Treatment | Cutting 1 | | Cutting 2 | | Total S Uptake (lb/A) |
| --- | --- | --- | --- | --- | --- |
| | % S | S Uptake (lb/A) | % S | S Uptake (lb/A) | |
| No gypsum | 0.13 | 3.20 | 0.18 | 3.53 | 6.73 |
| Uncoated gypsum | 0.15 | 3.88 | 0.21 | 4.38 | 8.26 |
| Gypsum + 0.2% polymer | 0.12 | 3.71 | 0.19 | 3.96 | 7.67 |
| Gypsum + 0.3% polymer | 0.14 | 4.29 | 0.24 | 5.20 | 9.49 |
| Am. sulfate | 0.25 | 8.24 | 0.25 | 5.11 | 13.35 |
| p > f | 0.001 | | 0.005 | | — |
| $LSD_{.10}$ | 0.034 | | 0.030 | | |

I claim:

1. A fertilizer composition comprising respective quantities of gypsum and a copolymer in contact with said gypsum, said copolymer being an acid form copolymer containing individual quantities of maleic and itaconic moieties, said copolymer being the dried residue of an aqueous copolymer dispersion having a pH of from about 0.1-2, said copolymer being present at a level such that the plant availability of calcium and/or sulfate ion is greater than the corresponding plant availability of uncoated gypsum.

2. The fertilizer composition of claim 1, said copolymer comprising at least about 93% by weight of itaconic and maleic moieties.

3. The fertilizer composition of claim 1, said copolymer being a copolymer containing from about 10-90% by weight maleic moieties, and from about 90-10% by weight itaconic moieties.

4. The fertilizer composition of claim 1, said copolymer being present at a level of from about 0.05-5% by weight, based upon the total weight of the composition taken as 100% by weight.

5. The fertilizer composition of claim 1, said gypsum being in the form of commercial grade agricultural gypsum.

6. The fertilizer composition of claim 1, said copolymer being essentially free of any moieties other than said maleic and itaconic moieties.

7. A method of fertilizing soil comprising the step of applying a fertilizer composition to soil, said fertilizer composition comprising respective quantities of gypsum and a copolymer, said copolymer being an acid form copolymer containing individual quantities of maleic and itaconic moieties, said copolymer being the dried residue of an aqueous copolymer dispersion having a pH of from about 0.1-2, said copolymer being present at a level such that the plant availability of calcium and/or sulfate ion is greater than the corresponding plant availability of uncoated gypsum.

8. The method of claim 7, said copolymer comprising at least about 93% by weight of itaconic and maleic moieties.

9. The method of claim 8, said copolymer being a copolymer containing from about 10-90% by weight maleic moieties, and from about 90-10% by weight itaconic moieties.

10. The method of claim 7, said copolymer being present at a level of from about 0.05-5% by weight, based upon the total weight of the composition taken as 100% by weight.

11. The method of claim 7, said copolymer being essentially free of any moieties other than said maleic and itaconic moieties.

12. A method of preparing a fertilizer composition including the steps of providing a quantity of gypsum, and at least partially coating said gypsum with a copolymer, said copolymer being an acid form copolymer containing individual quantities of maleic and itaconic moieties, said copolymer being the dried residue of an aqueous copolymer dispersion having a pH of from about 0.1-2, said copolymer being present at a level such that the plant availability of calcium and/or sulfate ion is greater than the corresponding plant availability of uncoated gypsum.

13. The method of claim 12, said copolymer having a pH of from about 0.2-0.8.

14. The method of claim 12, said copolymer being applied to said gypsum at a level of from about 0.05-5% by weight, based upon the total weight of the composition taken as 100% by weight.

* * * * *